Sept. 26, 1967
A. ALFORD
3,344,364
AMPLITUDE OF H.F. OSCILLATOR STABILIZED BY RECTIFIED OUTPUT OF L.F. OSC.
Filed Dec. 10, 1965
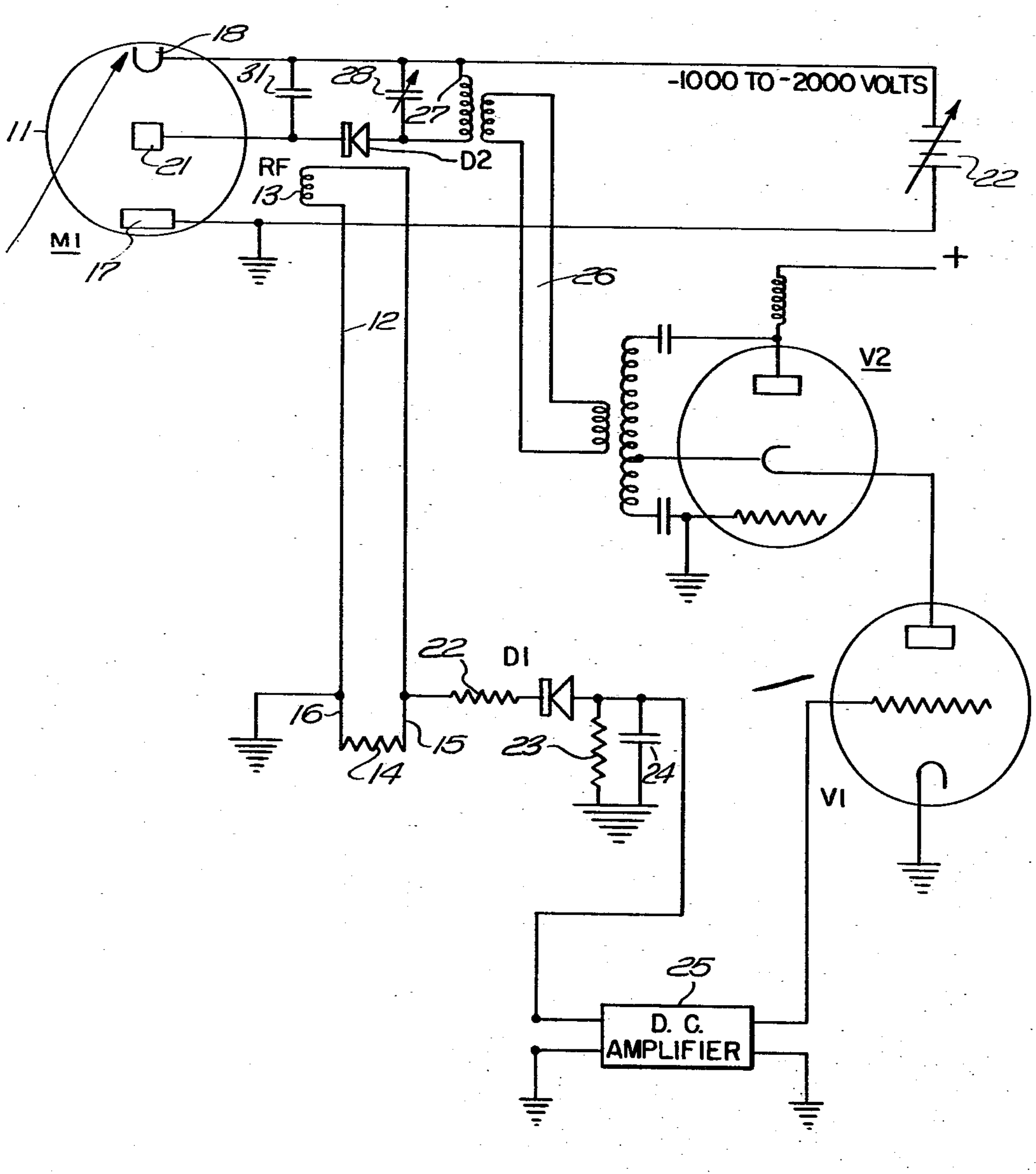
INVENTOR.
ANDREW ALFORD
BY Wolf, Greenfield & Hieken
ATTORNEYS 3,344,364

AMPLITUDE OF H.F. OSCILLATOR STABILIZED BY RECTIFIED OUTPUT OF L.F. OSC.

Andrew Alford, Winchester, Mass.
(299 Altantic Ave., Boston, Mass. 02110)

Filed Dec. 10, 1965, Ser. No. 512,944
3 Claims. (Cl. 331—86)

The present invention relates in general to signal generation and more particularly concerns novel apparatus for providing a signal of substantially constant amplitude over a relatively wide range of microwave frequencies.

It is an important object of this invention to provide a signal source of substantially constant amplitude.

It is a further object of the invention to provide a microwave signal source in accordance with the preceding object capable of providing a constant amplitude signal over a wide range of microwave frequencies.

It is another object of the invention to achieve the preceding objects with a microwave signal source emitting a signal of electronically controlled frequency.

It is still a further object of the invention to achieve the preceding objects with highly reliable apparatus.

According to the invention, there is a first signal amplifying device having at least a first control electrode whereby the amplification provided by the device is related to the biasing signal on the first control electrode. Circuit means including the first signal amplifying device is arranged to maintain oscillations at a selected one of the frequencies in the band and provide these oscillations to an output terminal. There is a second signal amplifying device having at least a second control electrode whereby the amplification of the second device is related to the biasing signal on the second control electrode. Second circuit means including the second signal amplifying device provide oscillations at a fixed frequency outside the band of frequencies at which the first circuit means sustains oscillations. First means responsive to the signal on the output terminal provide a first biasing signal that is applied to the second control electrode to control the amplitude of oscillations sustained by the second circuit means. Second means responsive to the latter oscillations provide a second biasing signal that is applied to the first control electrode to maintain the amplitude of oscillations provided on the output terminal substantially constant independent of the frequency within the said band.

Numerous other features, objects and advantages of the invention will become apparent from the following specification when read in connection with the accompanying drawing, the single figure of which shows a schematic circuit diagram of an exemplary embodiment of the invention.

With reference now to the drawing, a first signal amplifying device, such as a voltage tuneable magnetron M1 is arranged in a cavity envelope 11 to sustain oscillations within a predetermined range of microwave frequencies that are coupled by link coupling means 12 including a loop 13 to an R.-F. load 14 connected between output terminal 15 and ground terminal 16. The microwave oscillating circuit includes a normally grounded anode 17, a negative cathode 18 and a control electrode 21 interposed between cathode 18 and anode 17 bearing a biasing potential that controls the amplification of magnetron M1. The potential on cathode 18 is typically variable between −1,000 and −2,000 volts provided by variable potential source 22 to correspondingly vary the frequency of oscillations. Circuitry maintains the potential between control electrode 21 and cathode 18 of such a magnitude that the amplification of magnetron M1 is such as to maintain the amplitude of the signal developed across R.-F. load 14 substantially constant independent of the potential on cathode 18 and the frequency determined thereby.

To this end, a first rectifying circuit comprising a series resistor 22, diode D1 and the parallel combination of resistor 23 and capacitor 24 are connected between output terminal 15 and ground terminal 16 to develop a potential across capacitor 24 that is representative of the signal amplitude developed across R.-F. load 14. The potential on capacitor 24 is then amplified by D.-C. amplifier 25 to provide a regulating potential for biasing the control grid of series regulating tube V1 in series with the cathode of fixed frequency oscillator tube V2. The cathode of tube V1 is grounded and its plate is connected to the cathode of oscillator tube V2 so that the potential on the grid of tube V1 controls the cathode current of oscillator tube V2, and, hence, the intensity of oscillations. Oscillator tube V2 and associated components comprise a Hartley oscillator of conventional type that typically oscillates at a fixed frequency of 100 Kc with an amplitude determined by the potential on the grid of tube V1.

These fixed frequency oscillations are coupled by link coupling means 26 to a parallel tuned circuit comprising inductor 27 and variable capacitor 28 connected in series with diode D2 between control electrode 21 and cathode 18 and tuned to the frequency of oscillations provided by the high frequency oscillator comprising tube V2 to provide a D.-C. biasing potential across capacitor 31 that is effective in biasing control electrode 21 relative to cathode 18 so as to maintain the amplitude of oscillations across R.-F. load 14 substantially constant.

The apparatus thus described performs exceptionally well in providing a convenient means for adjusting the frequency of a microwave oscillator while maintaining the output of the oscillator essentially constant. The specific means for effecting control by varying cathode potential is especially advantageous from the standpoint of electronically sweeping the output frequency while maintaining the amplitude of the swept frequency output signal exceptionally constant. Although the voltage tuneable magnetron is especially advantageous for the sweep application because of the linear relation between anode-cathode potential and output frequency, other amplifying devices, such as backward wave oscillator tubes, may be used in accordance with the principles of the invention.

In an exemplary embodiment of the invention, a voltage tuneable magnetron was used to provide an output signal swept over a 1.5:1 frequency range embracing 2.5 gc. at a level of about 1 watt maintained constant within about a decibel.

It is apparent that those skilled in the art may now make numerous modifications and uses of and departures from the specific embodiment described herein without departing from the inventive concepts. Consequently, the invention is to be construed as embracing each and every novel feature and novel combination of features present in or possessed by the apparatus and techniques herein disclosed and as limited solely by the spirit and scope of the appended claims.

What is claimed is:

1. Apparatus for providing a high frequency signal of substantially constant amplitude within a first band of microwave frequencies comprising,
   a first high frequency amplifying device having at least a first control electrode whereby the amplification imparted by said device is related to the biasing signal on said first control electrode,
   an output terminal,
   first oscillatory circuit means including said first amplifying device for providing said substantially constant amplitude signal on said output terminal, means for selectively varying the oscillation frequency of said first oscillatory circuit means, a second signal amplifying device having at least a second control electrode whereby the amplification of said second signal amplifying device is related to the biasing signal on said second control electrode, second oscillatory circuit means including said second signal amplifying device for providing a substantially fixed frequency signal of frequency outside said microwave band, means responsive to the signal on said output terminal for providing a first biasing signal, means for applying said first biasing signal to said second control electrode to control the amplitude of oscillations provided by said second oscillatory circuit means, means responsive to the amplitude of oscillations provided by said second oscillatory circuit means for providing a second biasing signal, means for applying said second biasing signal to said first control electrode to maintain the signal on said output terminal of substantially constant amplitude independent of the frequency within said microwave band, said means for providing said second biasing signal comprising, coupling means coupled to said second oscillatory circuit means, first rectifying circuit means responsive to the energy received by said coupling means from said second oscillatory circuit means and intercoupling said first control electrode and said coupling means for providing said second biasing signal, said first high frequency amplifying device comprising a voltage tuned magnetron also having a cathode and an anode, the combination of at least a portion of said coupling means and said first rectifying circuit means intercoupling said cathode and said first control electrode, a source of an adjustable frequency controlling potential, and means for applying said frequency controlling potential between said cathode and said anode.

2. Apparatus in accordance with claim 1 wherein said coupling means includes a tuned circuit resonant substantially at said fixed frequency, the series combination of said tuned circuit and said first rectifying circuit means intercoupling said cathode and said first control electrode.

3. Apparatus in accordance with claim 2 wherein said means for providing said first biasing signal comprises, a second rectifying circuit means responsive to the energy on said output terminal for providing a rectified output signal, a second coupling means responsive to the latter rectified output signal for providing said first biasing signal, the latter coupling means comprising D-C amplifying means coupling said second rectifying circuit means to said second control electrode, a third amplifying device providing a controllable current in said second circuit means related to said amplitude of oscillations, and means for coupling said second signal amplifying device to said third signal amplifying device to establish said controllable current in accordance with the biasing signal applied to said second electrode.

References Cited

UNITED STATES PATENTS

| | | | |
|---|---|---|---|
| 1,931,660 | 10/1933 | Kautter | 330—137 |
| 2,817,716 | 12/1957 | Freedman | 330—137 |
| 2,840,648 | 6/1958 | Critchlow | 330—137 |

FOREIGN PATENTS

| | | |
|---|---|---|
| 640,874 | 5/1962 | Canada. |

ROY LAKE, *Primary Examiner.*

JOHN KOMINSKI, *Examiner.*